United States Patent Office 2,821,961
Patented Feb. 4, 1958

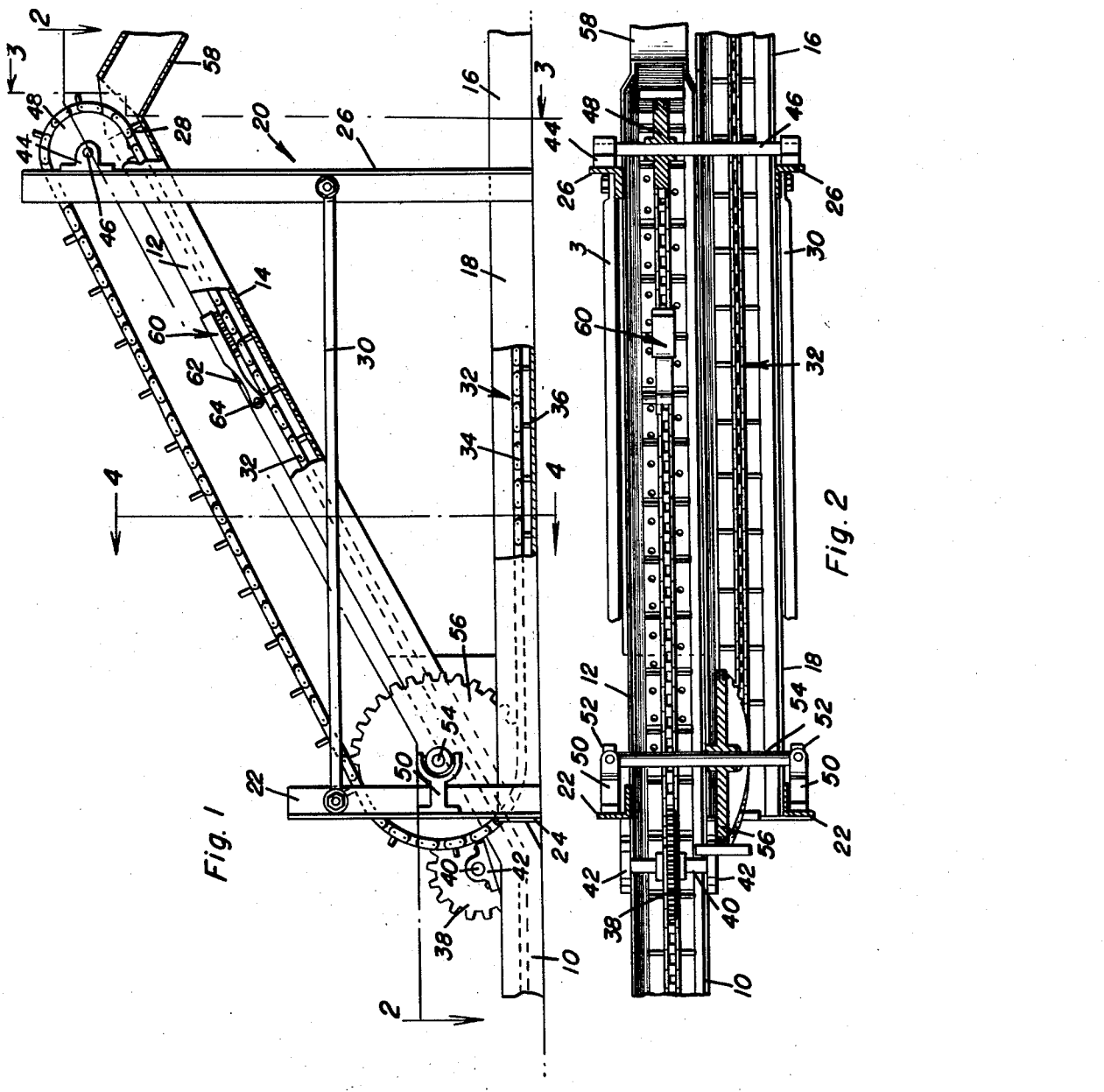

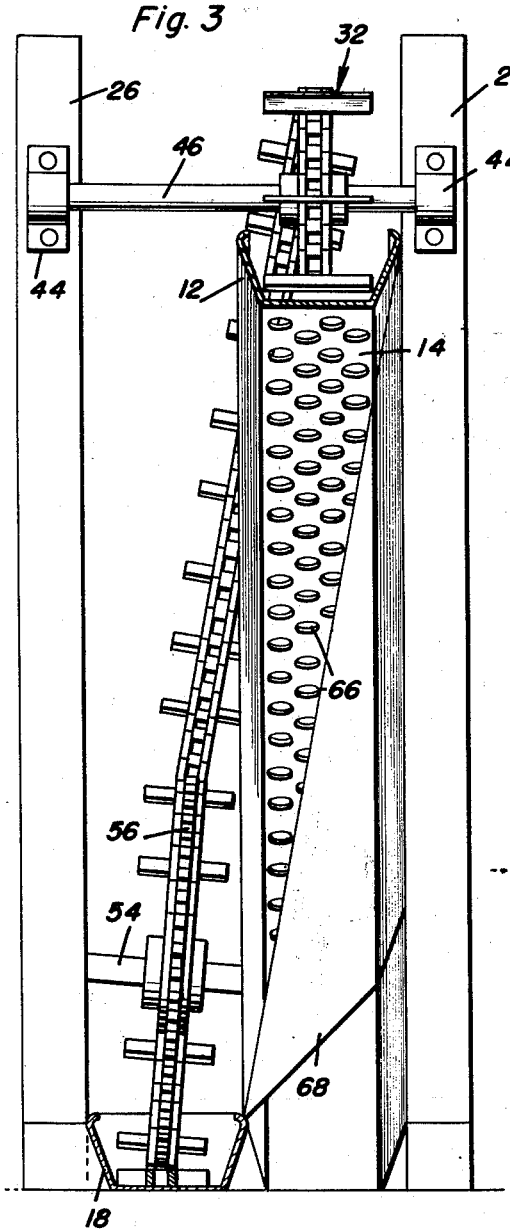
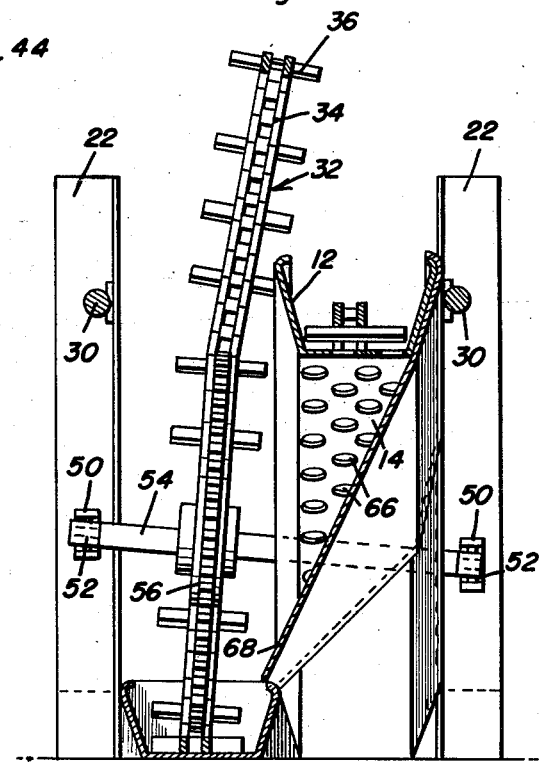

2,821,961
CONVEYOR AND SORTER
Ferdinand Mercoli, Vineland, N. J.
Application September 22, 1955, Serial No. 535,900
6 Claims. (Cl. 119—51)

This invention relates in general to conveyors and sorters, and more particularly to a litter ejector for chicken feeders.

Unless chicken mash and other chicken foods are free of foreign matters, the chicken will not eat it. This has been a major problem in automatic feeders for chickens inasmuch as the feed is fed continuously to open troughs and all types of litter has a tendency to fall therein. Further, the litter has a tendency to clog the conveyor chains and their guide sprockets so as to cause the chicken feeder to break down.

It is therefore the primary object of this invention to provide an improved sorter or litter ejector for chicken feeders which is of such a nature whereby it may be conveniently placed in a chicken feeder for automatically ejecting litter from chicken feed as it passes through the chicken feeder.

Another object of this invention is to provide an improved litter ejector for chicken feeders, the litter ejector being of such construction whereby it may be quickly and easily installed in existing chicken feeder constructions.

Still another object of this invention is to provide an improved litter ejector for chcken feeders, the litter ejector being of an extremely simple construction and formed of readily obtainable material so that the manufacture thereof is economically feasible.

A further object of this invention is to provide an improved sorter or foreign matter ejector which may be utilized in combination with a chicken feeder, the sorter being of such a nature whereby it is automatic in operation and will be operated in conjunction to the operation of the chicken feeder so that no additional mechanism is required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the sorter or litter ejector which is the subject of this invention and shows the same mounted in a chicken feeder, portions of troughs of the sorter being broken away and shown in section in order to clearly illustrate the relationship of the conveyor with respect thereto;

Figure 2 is a sectional view taken substantially upon the plane indicated by the section line 2—2 of Figure 1 and shows the general relationship of overlapping portions of first and second troughs of the combined chicken feeder and sorter;

Figure 3 is an enlarged sectional view taken substantially upon the plane indicated by the section line 3—3 of Figure 1 and shows the general appearance of the underside of a sorting trough of the sorter and the manner in which the conveyor is guided from the sorting trough to a feed receiving trough which is disposed below and to one side of the sorting trough; and Figure 4 is an enlarged sectional view taken substantially upon the plane indicated by the section line 4—4 of Figure 1 and shows the general position of a guide wheel for the conveyor so as to facilitate the directing thereof into an open end of the feed receiving trough.

Referring now to the drawings in detail, it will be seen that there is illustrated the sorter which is the subject of this invention. The sorter is a portion of a conventional chicken feeder construction and includes a first trough 10. The first trough 10 is merely a section of the conventional type chicken feeder. The first trough 10 has an upwardly sloping portion 12 which is provided with a perforated bottom wall 14, the trough portion 12 forming a sorting trough portion.

Disposed in the same horizontal plane as the first trough 10 is a second trough 16 which is also part of a conventional chicken feeder. The second trough 16 is offset to one side of the trough 10 and has a portion 18 thereof in overlapped relation with respect to the trough portion 12.

Supporting the trough portion 12 in upward sloping relation is a supporting frame which is referred to in general by the reference numeral 20. The supporting frame 20 includes a pair of first standards 22 one of which has its lower end rigidly secured to the trough portion 18 adjacent an open end 24 thereof. The frame 20 also includes a second pair of standards 26 one of which has its lower end rigidly secured to the trough portion 18 remote from the open end 24. The other of the standards 22 has an intermediate portion thereof secured to the trough portion 12 in supporting relation adjacent the intersection of the trough portion 12 with the main part of the first trough section 10. The other of the standards 26 is connected adjacent its upper end to the trough portion 12 adjacent its open end 28 in supporting relation. Thus, it will be seen that the frame 20 rigidly connects the trough portions 12 and 18. Connecting together adjacent ones of the standards 22 and 26 are horizontally disposed, longitudinally extending straps 30. The straps 30 further reinforce the frame 20.

Passing through the trough sections 10 and 16 is a conveyor which is referred to in general by the reference numeral 32. The conveyor 32 includes a conveyor chain 34 which has secured to the underside thereof scraper blades 36. The scraper blades 36 conform to the general contour of the lower portion of the trough sections 10 and 16 and move feed therethrough. It is to be understood that the trough sections 10 and 16 are communicated with a feed dispenser which continuously dispenses feed into the trough sections as required so that a continuous feeding operation will result.

In order that the conveyor 32 may pass upwardly through the sloping trough section 12, there is provided a first guide wheel or sprocket 38. The guide wheel 38 is carried by a shaft 40 which is rotatably mounted in pillow blocks 42 carried by the trough section 10 at its intersection with the trough portion 12. It will thus be seen that the guide wheel 38 will guide the conveyor 32 in its transition from a horizontal plane to an upwardly sloping plane.

Carried by the standards 26 adjacent their upper ends are transversely aligned pillow blocks 44, the pillow blocks 44 have suitably journaled therein a shaft 46 on which is mounted a guide wheel 48. The guide wheel 48 is aligned with the center of the trough portion 12 at the upper open end thereof and permits the reversal of direction of the conveyor 32 in the manner best illustrated in Figure 3.

Carried by the standards 22 intermediate the ends thereof are supports 50 of self-aligning bearings 52. Suitably journaled in the self-aligning bearings 52 is a shaft 54 which carries a guide wheel 56. The guide wheel 56 is disposed at the open end 24 of the trough portion 18 and guides the conveyor 32 as it moves downwardly from the guide wheel 48 into the trough portion 18. In order to compensate for the offset relation of the trough portions 12 and 18, it will be seen that the guide wheel 56 is tilted slightly of a vertical plane. To accommodate this, the shaft 54 is disposed at a slight angle to the horizontal, as is best illustrated in Figure 3.

In order that litter and other foreign matter may be removed from the sorter and caught, there is provided at the open end 28 of the trough portion 12 a chute 58. The chute 58 is intended to receive all trash and litter and move it to suitable containers (not shown) for disposal.

In order to fully clean the conveyor chain 24, there is mounted in the trough portion 12 intermediate its ends a brush which is referred to in general by the reference numeral 60. The brush 60 includes a handle 62 which is pivotally mounted on a pivot pin 64 extending between the side walls of the trough portion 12. It will be understood that the brush 60 rests upon the conveyor chain 34 due to its own weight and that it will effectively remove loose particles of food and foreign matter from the conveyor chain. This will prevent the eventual clogging of the conveyor chain and the guide wheels therefor.

In the operation of the sorter, chicken feed and litter and other foreign matter is fed into the sorter as the conveyor 32 moves through the trough section 10 into the trough portion 12. As the feed and foreign matter moves upwardly through the trough portion 12, the feed falls through the relatively small opening 66 in the perforated bottom wall 14. Inasmuch as the foreign matter and litter to be removed is larger than the feed, it will not fall through the openings 66 and will be moved up through the trough portion 12 and out of the open end 28 thereof into the chute 58. In this manner the litter and other foreign matter will be removed from the feed.

Inasmuch as the trough portion 12 is offset from the trough portion 18, the feed falling from the trough portion 12 would have the tendency to miss the trough portion 18. Therefore, there is provided a deflector 68. It will be noted that the deflector 68 extends between side walls of the trough portions 12 and 18 and underlies the trough portion 12 to direct feed falling therefrom into the trough portion 18.

It is to be understood that the conveyor 32 may be of any desired construction and the trough sections of any desired cross-section.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A material sorter for an endless conveyor comprising first and second trough sections, said trough sections receiving said endless conveyor, said trough sections having offset overlapping portions, one of said overlapping portions being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, guide means for said endless conveyor at remote ends of said trough sections for retaining portions of said conveyor intermediate said trough sections out of the way of the normal path of material passing through said perforated bottom wall.

2. A material sorter for an endless conveyor comprising first and second trough sections, said trough sections receiving said endless conveyor, said trough sections having offset overlapping portions, one of said overlapping portions being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, guide means for said endless conveyor at remote ends of said trough sections for retaining portions of said conveyor intermediate said trough sections out of the way of the normal flow path of material passing through said perforated bottom wall, said one overlapping portion having an open end, a chute disposed at said open end for receiving material of a size too large to pass through said perforated bottom wall.

3. A material sorter for an endless conveyor comprising first and second trough sections, said trough sections receiving said endless conveyor, said trough sections having offset overlapping portions, one of said overlapping sections being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, guide means for said endless conveyor at remote ends of said trough sections for retaining portions of said conveyor intermediate said trough sections out of the way of the normal flow path of material passing through said perforated bottom wall, said one overlapping portion being disposed at a slope, said conveyor including scooper blades to insure passage of material through said one overlapping portion.

4. A material sorter for an endless conveyor comprising first and second trough sections, said trough sections receiving said endless conveyor, said trough sections having offset overlapping portions, one of said overlapping portions being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, said overlapping portions having spaced open ends, guide wheels at said open ends, said conveyor being entrained over said guide wheels in direction reversing relation, portions of said conveyor intermediate said guide wheels being out of the way of the normal flow path of material passing through said perforated bottom wall.

5. A material sorter for an endless conveyor comprising first and second trough sections, said trough sections receiving said endless conveyor, said trough sections having overlapping portions, one of said overlapping portions being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, said one overlapping portion being disposed at a slope, said conveyor including scooper blades to insure passage of material through said one overlapping portion, said overlapping portions having spaced open ends, guide wheels at said open ends, said conveyor being entrained over said guide wheels in direction reversing relation, portions of said conveyor intermediate said guide wheels being out of the way of the normal flow path of material passing through said perforated bottom wall.

6. A material sorter for an endless conveyor comprising first and second trough sections, said trough sections receiving said endless conveyor, said trough sections having overlapping portions, one of said overlapping portions being elevated relative to the other of said overlapping portions, said one overlapping portion having a perforated bottom wall forming a sorting sieve, a deflector underlying said perforated bottom wall to direct sorted material passing through said perforated bottom wall into said other overlapping portion, said one overlapping portion being disposed at a slope, said conveyor including scooper blades to insure passage of material through said one overlapping portion, said overlapping portions having spaced open ends, guide wheels at said open ends, said conveyor being entrained over said guide wheels in direction reversing relation, a frame supporting said one overlapping portion relative to said other overlapping portion, said guide wheels being supported by said frame, portions of said conveyor intermediate said guide wheels being out of the way of the normal flow path of material passing through said perforated bottom wall.

References Cited in the file of this patent

UNITED STATES PATENTS

| | | |
|---|---|---|
| 735,713 | Crofoot | Aug. 11, 1903 |
| 2,591,609 | Roberts et al. | Apr. 1, 1952 |
| 2,709,520 | Stark | May 31, 1955 |